United States Patent
Bous

(10) Patent No.: US 9,576,383 B2
(45) Date of Patent: Feb. 21, 2017

(54) INTERACTIVE CHART AUTHORING THROUGH CHART MERGING

(71) Applicant: Geraldine Bous, Mougins (FR)

(72) Inventor: Geraldine Bous, Mougins (FR)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 14/586,665

(22) Filed: Dec. 30, 2014

(65) Prior Publication Data

US 2016/0188185 A1 Jun. 30, 2016

(51) Int. Cl.

| | |
|---|---|
| G06F 3/0484 | (2013.01) |
| G06F 17/30 | (2006.01) |
| G06F 3/0482 | (2013.01) |
| G06F 3/0486 | (2013.01) |
| G06N 99/00 | (2010.01) |
| G06T 11/20 | (2006.01) |
| G06F 17/24 | (2006.01) |
| G06Q 10/10 | (2012.01) |

(52) U.S. Cl.
CPC ........... *G06T 11/206* (2013.01); *G06F 17/246* (2013.01); *G06Q 10/10* (2013.01)

(58) Field of Classification Search
CPC ....... G06T 11/206; G06F 17/246; G06Q 10/10
See application file for complete search history.

(56) References Cited

U.S. PATENT DOCUMENTS

| | | | | |
|---|---|---|---|---|
| 2003/0071814 A1* | 4/2003 | Jou | .......................... | G06F 9/542 345/440 |
| 2008/0062175 A1* | 3/2008 | Arya | ...................... | G06T 11/206 345/440 |
| 2012/0316841 A1* | 12/2012 | Rameau | ................... | G06F 17/50 703/1 |
| 2015/0015504 A1* | 1/2015 | Lee | ...................... | G06F 3/04845 345/173 |
| 2015/0262396 A1* | 9/2015 | Devarajan | ......... | G06F 17/30554 345/440.1 |

* cited by examiner

*Primary Examiner* — Asher Kells
(74) *Attorney, Agent, or Firm* — Schwegman Lundberg & Woessner, P.A.

(57) ABSTRACT

A first chart and a second chart are parsed to determine one or more measures, dimensions, and filters visualized in the first chart and the second chart. The number of measures, dimensions, and filters visualized in the first chart and the second chart are calculated. It is determined how many of the number of measures, dimensions, and filters visualized in the first chart and the second chart are the same. One or more merge rules corresponding to the number of measures, dimensions, and filters visualized in the first chart and to the number of measures, dimensions, and filters visualized in the second chart that aren't the same as measures, dimensions, and filters visualized in the first chart are obtained, and one or more merge permutations are derived based on the obtained merge rules. The first chart and the second chart are merged in accordance with one of the merge permutations.

20 Claims, 9 Drawing Sheets

INTERACTIVE CHART AUTHORING THROUGH CHART MERGING

TECHNICAL FIELD

This document generally relates to systems and methods for use with chart authoring tools. More specifically, this document relates to interactive chart authoring through chart merging.

BACKGROUND

Modern business intelligence tools allow for the visual analysis of data so that technical or non-technical users can create charts through a variety of techniques. These techniques include selecting measures, dimensions, filters, and chart types (e.g., bar charts, pie charts, etc.) to create a chart, or creating a chart from an existing chart by performing a selection on the existing chart.

While these visualization generation approaches are relatively simple and easy to understand for a layperson, they also have several limitations. They tend to only be simple for basic charts (e.g., one dimension, measure, and filter). They can be quite complex to generate charts with multiple filters, for example. Additionally, they do not allow the user to reuse previous (e.g., existing) charts to compose new ones.

DESCRIPTION OF DRAWINGS

The present disclosure is illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a framework is provided for generating charts by merging existing charts. The merge process can be triggered by selecting several charts and triggering the merge/creation process, for example by clicking a merge button or dragging and dropping charts onto one another.

In an example embodiment, once the merge process is triggered, a merge engine may identify the measures, dimensions, filters, and chart types of the input chart and automatically determine how this information (or part of it) can be combined to form new charts. The output from the merge engine may be one or more chart specifications that may be presented and/or recommended to the user. In an example embodiment, each chart specification may include dimensions, measures, filters and chart-type. In an example embodiment, the one or more chart specifications may be presented to the user in a selection list, ranked by relevance. The user then can select one of the recommended chart specifications in order for the merging process to complete and the new merged chart to be visualized.

The term "measure" is intended to include quantitative data, such as number of units sold, number of unique visits, profit and so on.

The term "dimensions" is intended to include categorical data, such as state, gender, product name or units of time (e.g., day, week, month). Generally, dimensions may be used to group quantitative data into useful categories (e.g., number of units sold by state).

The term "filters" is intended to include aspects that cause data to be limited (i.e., "filtered") in some way by ignoring or discarding specified data or data types.

Figure 1:
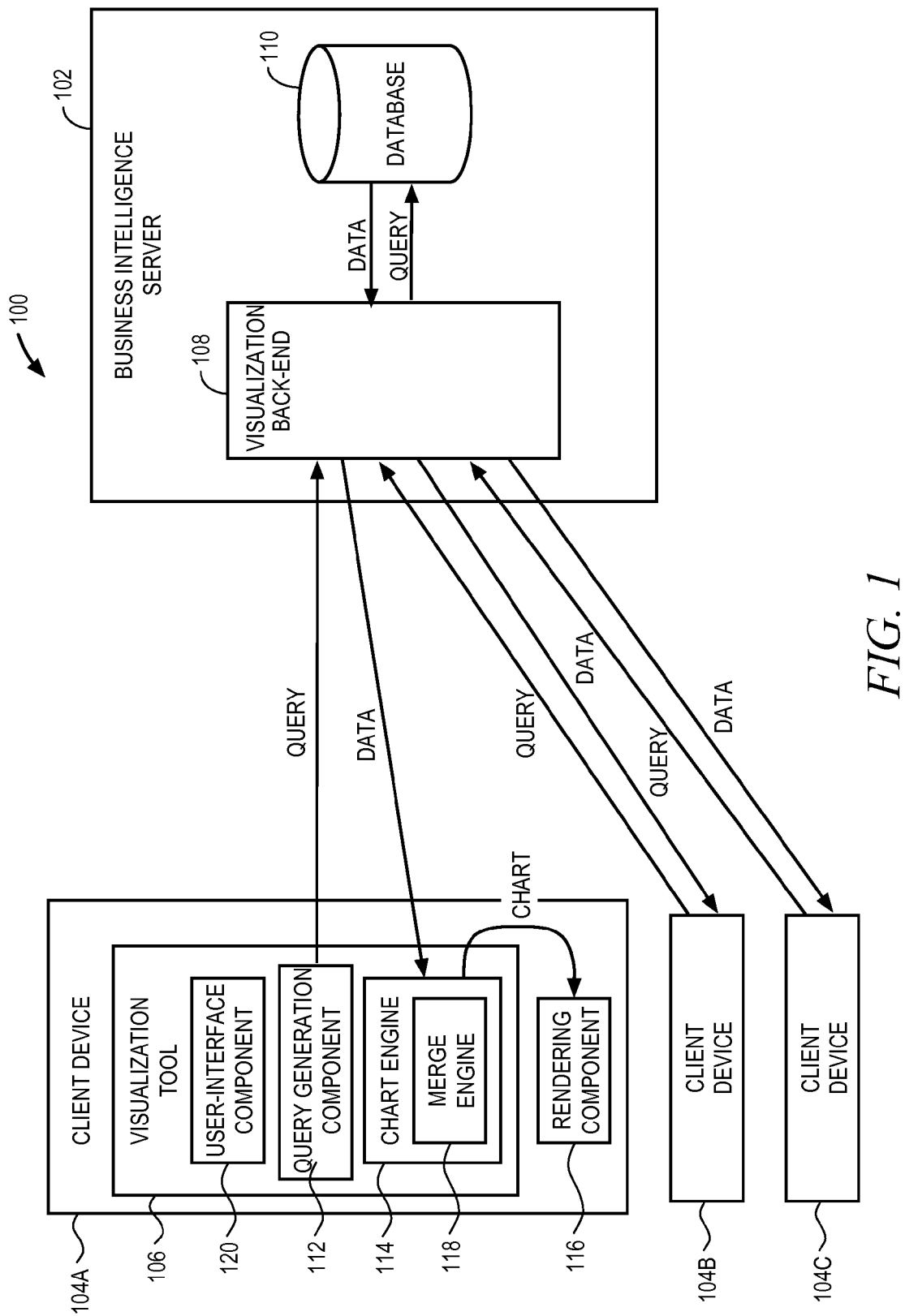
FIG. 1 is a block diagram illustrating a system, in accordance with an example embodiment, for chart merging.

FIG. 1 is a block diagram illustrating a system 100, in accordance with an example embodiment, for chart merging. The system 100 may include a business intelligence server 102 and one or more client devices 104A-104C. In this example embodiment, one or more of the client device 104A-104C may have installed thereon a visualization tool 106 that permits users of the client devices 104A-104C to visualize information maintained by the business intelligence server 102. Each visualization tool 106 may send requests for information from a visualization back-end 108 in the business intelligence server 102, which may pass data queries to one or more databases 110 maintained by the business intelligence server 102. In an example embodiment, the one or more databases 110 are in-memory databases, meaning that they are maintained within the system memory of the business intelligence server 102. In another example embodiment, however, the one or more databases 110 are persisted outside of the business intelligence server 102. The one or more databases 110 may return data relevant to the data queries to the visualization back-end 108, which may pass such data to the relevant visualization tool(s) 106.

Each visualization tool 106 may include a query generation component 112 designed to generate the queries to the visualization back-end 108 based on user action, such as selections of data sources and identifications of information in the data sources through, for example, the identification of dimensions, measures, and filters. A chart engine 114 may then take this data and create one or more charts based on the data and specifications (such as specification of a chart type and format) by a user. The one or more charts may then be passed to a rendering component 116 on the corresponding client device 104A-104C, which may display the chart on a display either integrated within, or in communication with, the client device 104A-104C.

In an example embodiment, the chart engine 114 may include a merge engine 118 that acts to identify measures, dimensions, filters, and chart-types in input charts and determine how this information (or part of it) can be combined to form new charts. Chart specification(s) are then output to a user-interface component 120, which presents the specification(s) to the user for selection. The user selection may then be sent to the chart engine 114, which may retrieve the corresponding chart specification from the merge engine 118 and pass it to the rendering component 116 for display.

Figure 2:
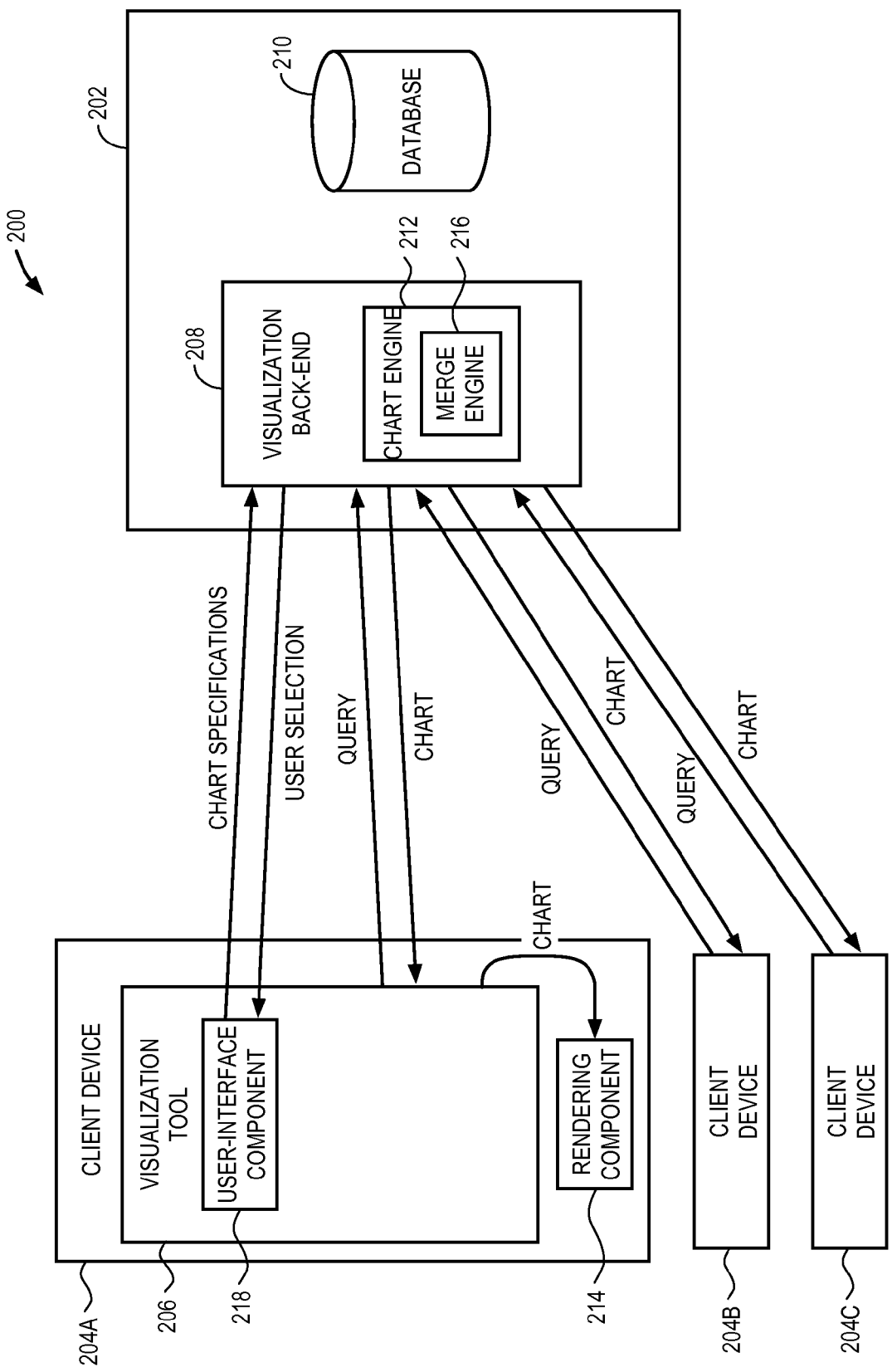
FIG. 2 is a block diagram illustrating a system, in accordance with another example embodiment, for chart merging.

In an alternative example embodiment, the chart engine 114 may be located partially or completely in the visualization back-end 108, in lieu of the visualization tool 106. In other words, the merging process described herein could be performed on the business intelligence server 102 rather than on one of the client devices 104A-104C. FIG. 2 is a block diagram illustrating a system 200, in accordance with another example embodiment, for chart merging. The system 200 may include a business intelligence server 202 and one or more client devices 204A-204C. In this example embodiment, one or more of the client device 204A-204C may have installed thereon a visualization tool 206 that permits users of the client devices 204A-204C to visualize information maintained by the business intelligence server 202. Each visualization tool 206 may send requests for information from a visualization back-end 208 in the business intelligence server 202, which may pass data queries to one or more databases 210 maintained by the business intelligence server 202. In an example embodiment, the one or more databases 210 are in-memory databases, meaning that they are maintained within the system memory of the business intelligence server 202. In another example embodiment, however, the one or more databases 210 are persisted outside of the business intelligence server 202. The one or more databases 210 may return data relevant to the data queries to the visualization back-end 208, which may include a chart engine 212. The chart engine 212 may then take this data and create one or more charts based on the data and specifications (such as specification of a chart type and format) by a user. The one or more charts may then be passed to a visualization tool 206, which may pass the one or more charts to a rendering component 214 on the corresponding client device 204A-204C, which may display the chart on a display either integrated within, or in communication with, the client device 204A-204C.

In an example embodiment, the chart engine 212 may include a merge engine 216 that acts to identify measures, dimensions, filters, and chart-types in input charts and determine how this information (or part of it) can be combined to form new charts. Chart specification(s) are then output to a user-interface component 218 in the visualization tool 206, which presents the specification(s) to the user for selection. The user selection may then be sent to the chart engine 212, which may retrieve the corresponding chart specification from the merge engine 216 and pass it to the visualization tool 206, which passes it to the rendering component 214 for display.

Figure 3:
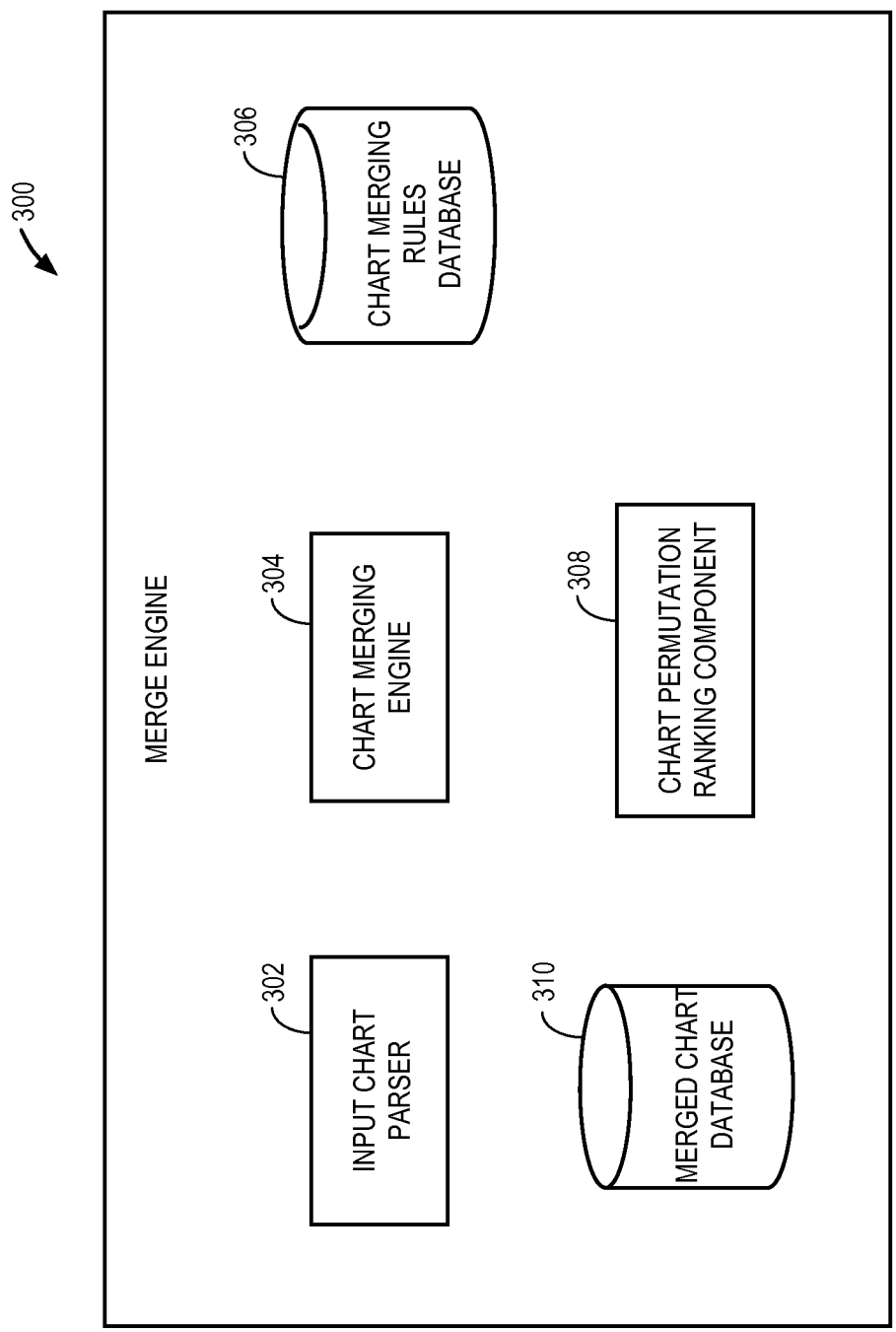
FIG. 3 is a block diagram illustrating a merge engine in accordance with an example embodiment.

FIG. 3 is a block diagram illustrating a merge engine 300 in accordance with an example embodiment. In an example embodiment, the merge engine 300 may be the merge engine 118 of FIG. 1 or the merge engine 216 of FIG. 2.

In an example embodiment, the merge engine 300 may include an input chart parser 302. The input chart parser 302 may parse any input charts passed to the merge engine 300 into corresponding measures, dimensions, filters, and chart types. In other words, the input chart parser 304 has the ability to take an input chart (or an underlying chart specification file describing an input chart) and derive therefrom any measures, dimensions, and filters in the input chart, as well as identify a chart type for the input chart. A chart merging engine 304 may then take the measures, dimensions, filters and chart types for two or more charts from the input chart parser 302 and retrieve one or more chart merging rules from a chart merging rules database 306. The chart merging rules database 306 may include rules on different possible ways to merge different combinations of measures, dimensions, filters, and input charts. The rules returned may, for example, identify the different possible merge combinations and indicate that a user should be prompted for selection of which of the different possible merge combinations to visualize. These different possible merge combinations may be known as merge permutations for a given two or more input charts and thus, in one example embodiment, the chart merging rules database 306 includes a rule stating the different merge permutations for the given two or more input charts as well as instructions indicating that the chart merging engine 304 should ask the user to select which permutation to visualize. In another example embodiment, however, the chart merging rules database 306 may include rules specifying a selection of which permutation to choose, or an algorithm defining a process whereby the chart merging engine 304 can derive which permutation to select on its own, without additional user input.

In cases where the user is to be prompted to select which of different possible merge combinations to visualize, there are a variety of ways in which this information can be presented to the user. In an example embodiment, a ranked list of the different possible merge combinations is presented to the user, with the highest ranked combination displayed highest on the list. This ranking may be derived from a chart permutation ranking component 308 which acts to rank the various permutations on a variety of factors. In an example embodiment, at least one of these factors is the relevance of the permutation to a user. This relevance can be determined based on, for example, previous user actions in the visualization tool 206, a user profile for the user, an examination of the underlying data in the input charts, etc. In an example embodiment, the chart permutation ranking component 308 can utilize one or more machine learning algorithms to determine preferences for a user based on the variety of factors described above.

In an example embodiment, merged charts could also be saved in a merged chart database 310, which allows a user to select a merged chart for additional merging with another chart, allowing for reuse of the charts. Indeed, the user is able to build an entire library of different charts merely by indicating two or more existing charts to merge.

Figure 4:
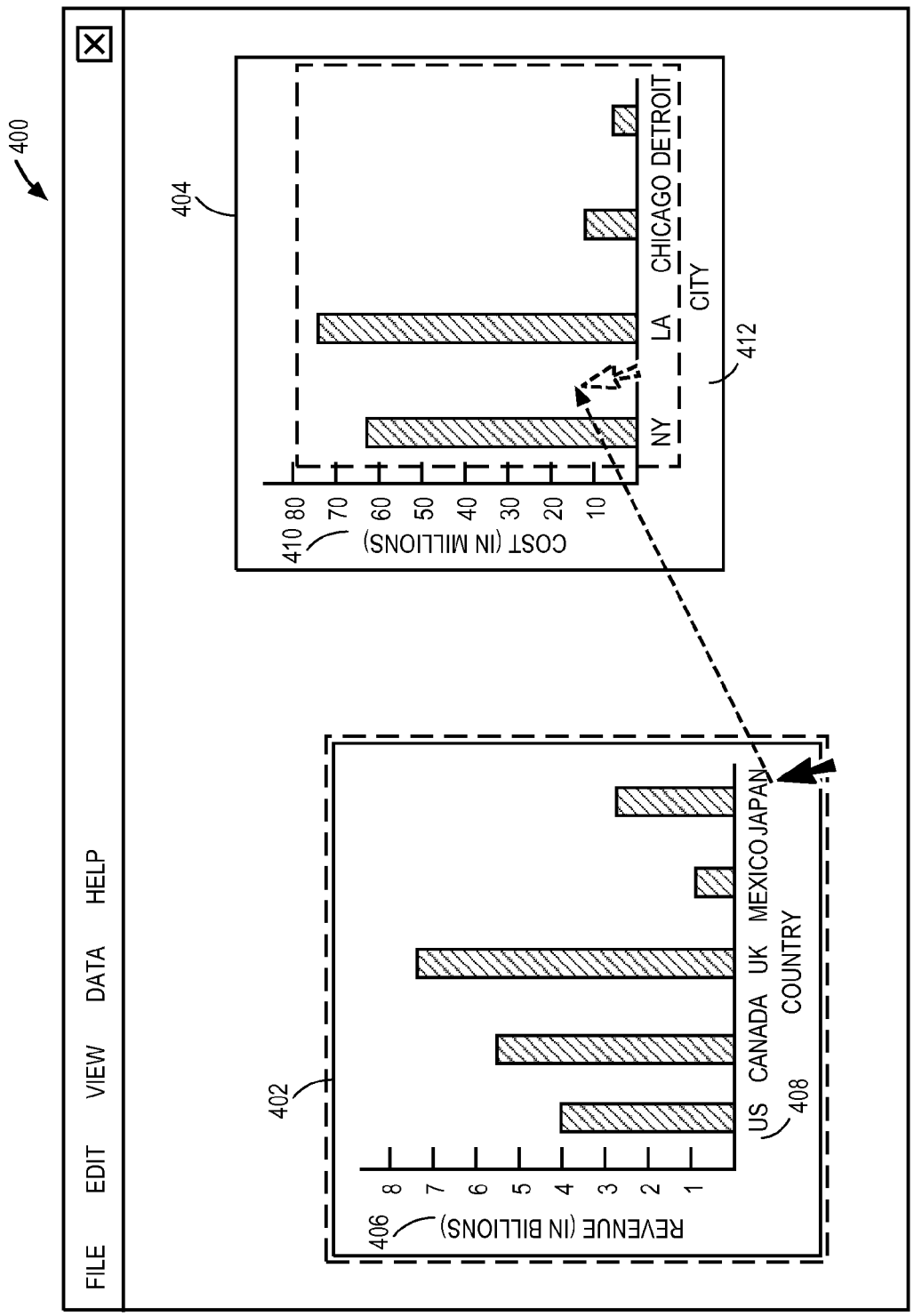
FIG. 4 is a screen capture illustrating a visualization tool depicting a first chart and a second chart in accordance with an example embodiment.
Figure 5:
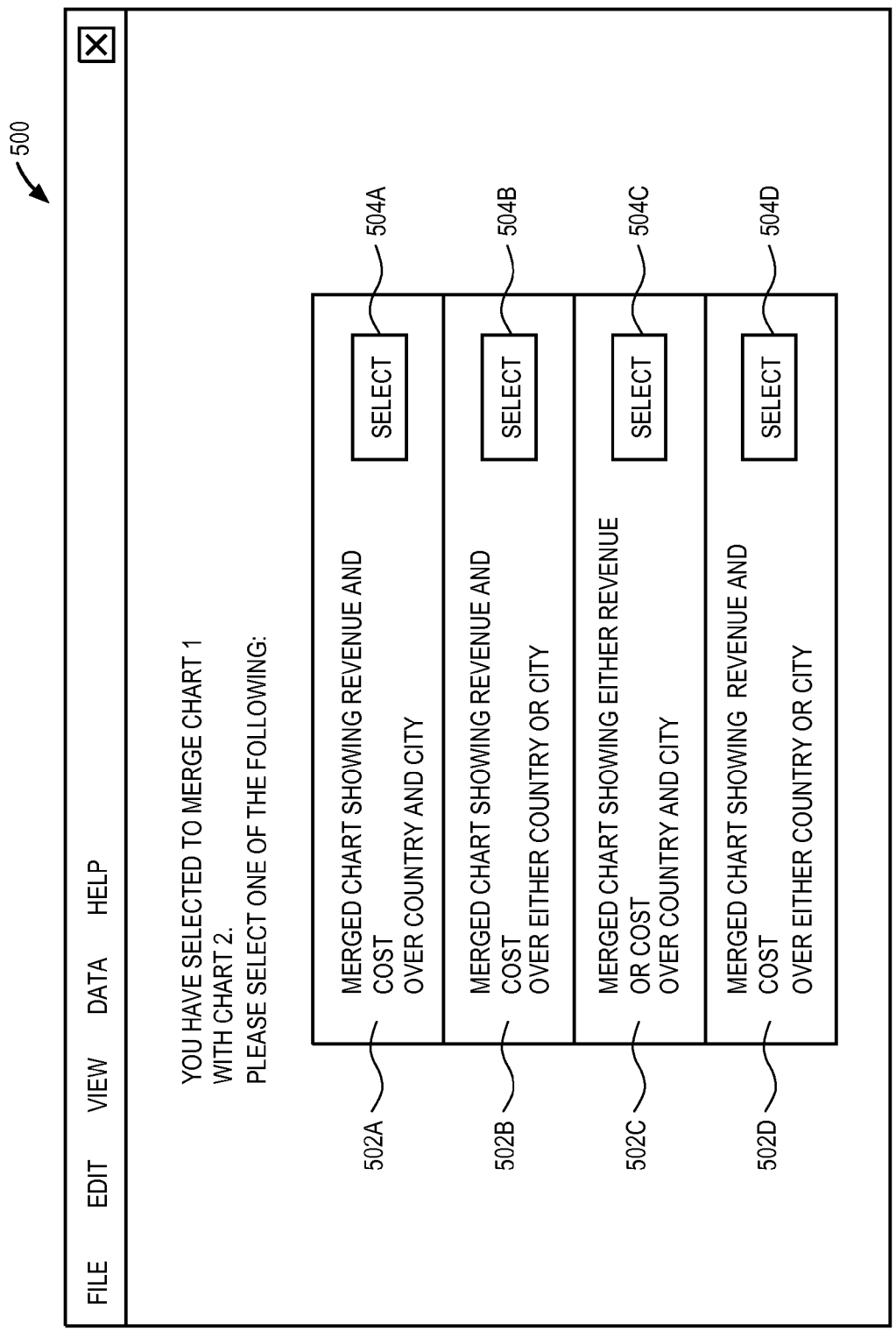
FIG. 5 is a screen capture illustrating a visualization tool depicting four possible merge permutations.
Figure 6:
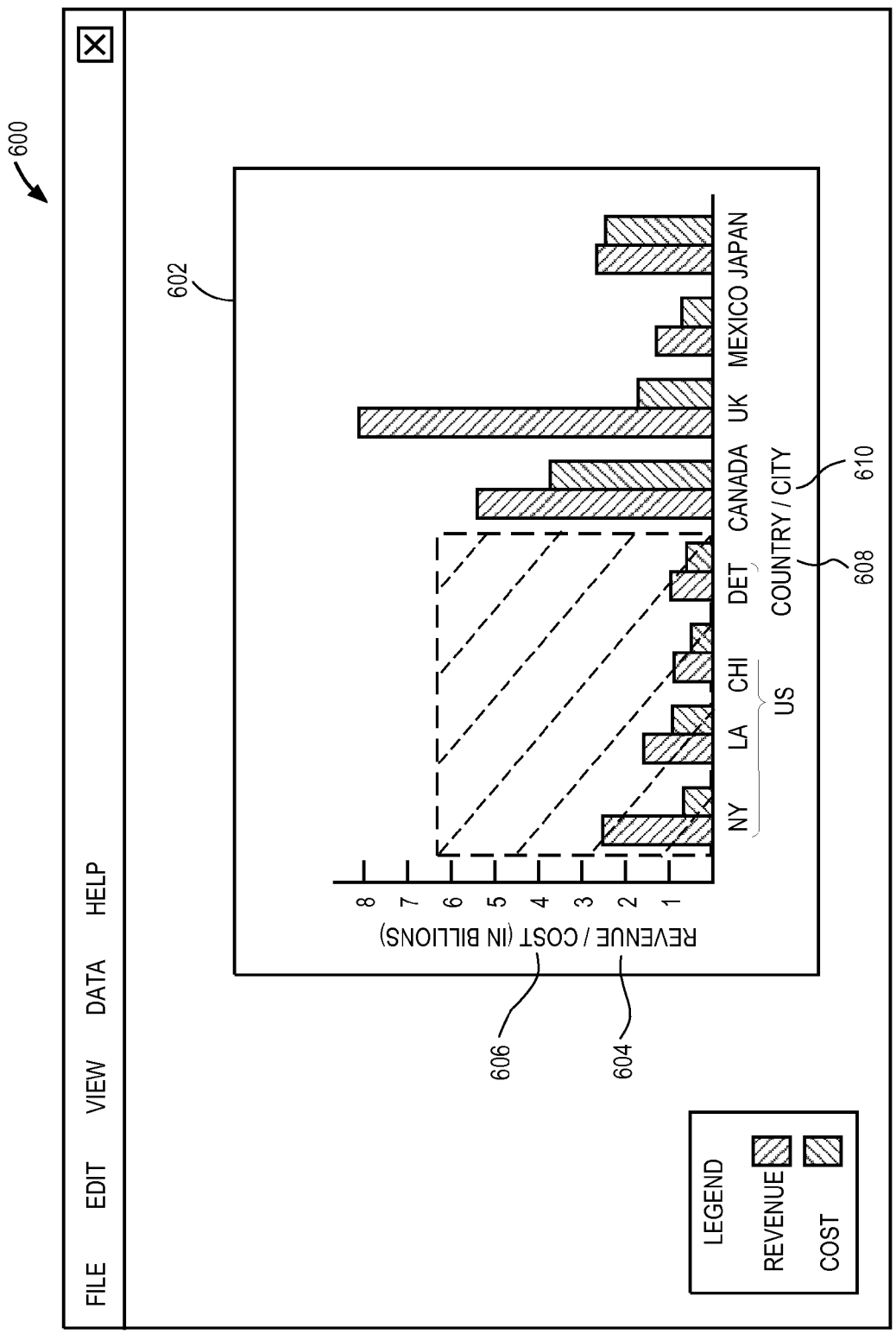
FIG. 6 is a screen capture illustrating a visualization tool depicting a merged chart.

The selection of which charts to use as input charts to the merging process can vary based on implementation. In an example embodiment, a user may "drag and drop" a first chart onto a second chart to indicate the merging of the two charts. FIGS. 4-6 depict screen captures of such a process using a "drag and drop" method to select charts to merge. FIG. 4 is a screen capture illustrating a visualization tool 400 depicting a first chart 402 and a second chart 404 in accordance with an example embodiment. The first chart 402 is a bar chart showing revenue 406 per country 408. The second chart 404 is a bar chart showing cost 410 over city 412. The visualization tool 400 also depicts a cursor moving the first chart 402 onto the second chart 404 in a "drag and drop" motion.

In response to the detection of a drag and drop of the first chart 402 onto the second chart 404, the input chart parser 304 parses the first input chart 402 and determines that it comprises one measure and one dimension, the measure being revenue 406 and the dimension being country 408. The input chart parser 304 also parses the second input chart 404 and determines that it comprises one measure and one dimension, the measure being cost 410 and the dimension being city 412. The chart merging engine 304 then retrieves one or more chart merging rules based on the fact that a first bar chart having one measure and one dimension is being merged with a second bar chart having one measure and one dimension. The chart merging rules, in this case, may indicate that there are four possible merge permutations. FIG. 5 is a screen capture illustrating a visualization tool 500 depicting four possible merge permutations 502A-502D. These four possible merge permutations 502A-D may be presented visually in declining order based on their relevance to the user which, as described above, can be based on a number of different factors and may involve machine learning techniques.

The first possible merge permutation 502A involves a merged chart showing two measures and two dimensions. In this case, since this is at the top of the list, merge permutation 502A may be the one that is "recommended" for the user. The user can select button 504A if he or she wishes to select this merge permutation 502A as the merged chart to visualize, at which point the charts can be merged based on this selection and visualized without further user input.

The second possible merge permutation 502B involves a merged chart having two measures and one dimension. Should the user select this option by selecting button 504B, the user may be presented with a further screen where he or she may need to select which of the two dimensions should be visualized in the combined chart, country 408 or city 412.

The third possible merge permutation 502C involves a merged chart having one measure and two dimensions. Should the user select this option by selecting button 504C, the user may be presented with a further screen where he or she may need to select which of the two measures should be visualized in the combined chart: revenue 406 or cost 410.

The fourth possible merge permutation 502D involves a merged chart having one measure and one dimension. Should the user select this option by selecting button 504D, the user may be presented with a further screen where he or she may need to select which of the two measures should be visualized in the combined chart: revenue 406 or cost 410, and which of the two dimensions should be visualized in the combined chart: country 408 or city 412.

No matter which merge permutation 502A-502D is selected, there may be additional rules in the chart merging rules to be executed by the chart merging engine 304 prior to visualization. For example, there may be a rule specifying that if the dimensions in different charts are different, but do in fact belong to the same hierarchy, they can be merged using a split-by operation. Thus, in this case, since country 408 and city 412 are part of the same hierarchy (location), if the user selects a merge permutation 502A-D where the two dimensions are both selected to be visualized in the merged chart, such as merge permutation 502A or merge permutation 502C, the split-by operation should be performed.

FIG. 6 is a screen capture illustrating a visualization tool 600 depicting a merged chart 602. Here, the user has selected merge permutation 502A, which causes merged chart 602 to be a bar chart depicting both revenue 604 and cost 606 over country 608 split by city 610.

It should be noted that, in some instances, the merged chart 602 may benefit from additional data from the database 210 or other data source where the original data was gathered to form the input charts. For example, in FIG. 4, the second chart 404 only depicts costs for cities in the U.S. This may be considered a filter which, as will be described later, could be integrated into the merged chart. However, in another example embodiment, and in fact the example embodiment depicted in FIG. 6, the merged chart 602 includes data related to the measure (here cost 606) for data points other than those in the second chart 404, specifically here, the merged chart 602 includes cost 606 information for other countries, including Canada, UK, Mexico, and Japan.

It should also be noted that while the above depicts a process involving a drag-and-drop interface used to select input charts, any input mechanism could be used to select such charts. For example, a text-based interface could be used for a user to manually describe which charts to merge. Additionally, interfaces are possible where more than two charts can be merged, such as allowing the user to select four charts to merge, although the underlying process still may involve merging charts two at a time.

It should also be noted that the above examples are of two bar charts being merged into a single bar chart, but there is no requirement that the input charts be of the same chart type or that the merged chart 602 be of a chart type that matches any of the input chart types. For example, an input bar chart could be merged with an input line graph and form a merged pie chart, and so on.

Typical business intelligence charts use up to two measures and two dimensions, however it is always possible to nest the dimensions and, for each nested dimension tuple, to show several measures. Applying this idea arbitrarily, however, can lead to reduced readability of the charts. There are chart types that are more suitable to a higher number of measures and dimensions, for example scatterplots, which allow the display of an arbitrary number of measures with one or two dimensions, and parallel coordinate charts, which allow the displaying of an arbitrary number of dimensions or measures.

When the charts to be merged contain filters, a number of additional situations can arise. In a first example, a set of filters could be disjoint. More precisely, each chart could contain filters on measures and/or dimensions that the other chart does not. In this case, the filters can be merged using an AND operator. For example, if a first chart 402 contains an inclusion filter on Countries={France, China, USA, Germany} and a second chart 404 contains a value filter on Revenue>10 Million USD, the merged chart 602 then contains both filters, i.e. Countries={France, China, USA, Germany} AND that have a Revenue>10 Million USD.

The two charts alternatively can share one or more filters on one or more dimensions and measures. In this case, the filters can be joined either with the AND or OR operators. For example, if a first chart 402 contains a filter on Countries={France, China}, while a second chart 404 has a filter on Countries={China, USA}, the merging with OR leads to {France, China, USA}, while merging with AND produces the inclusion filter {China}. Note that merging with AND may in this case lead to empty sets, which is why the intent of the user, when merging to filters on the same dimension/measure, should also be interpreted as an OR operation. The option as to whether the OR or the AND is used could be determined automatically via various rules and/or machine learning algorithms, or the option could be presented to the user for selection.

The procedure of merging charts can be also applied to chart-specifications that rely on different datasets. Two situations can arise. In a first situation, both charts share one or more dimensions. In this case, the set of tuples can be merged. For example, consider two charts showing Revenue per Country; the first one is built from a dataset that has the values for {France, USA}, while the second chart 404 has the values for {Russia, UK}. The merge operation then merges the datasets by producing a chart that shows Revenue PER Country for {France, USA, Russia, UK}.

A second situation is where both charts have different dimensions or measures. In this case, the content can be merged as if both charts stem from the same dataset.

Figure 7:
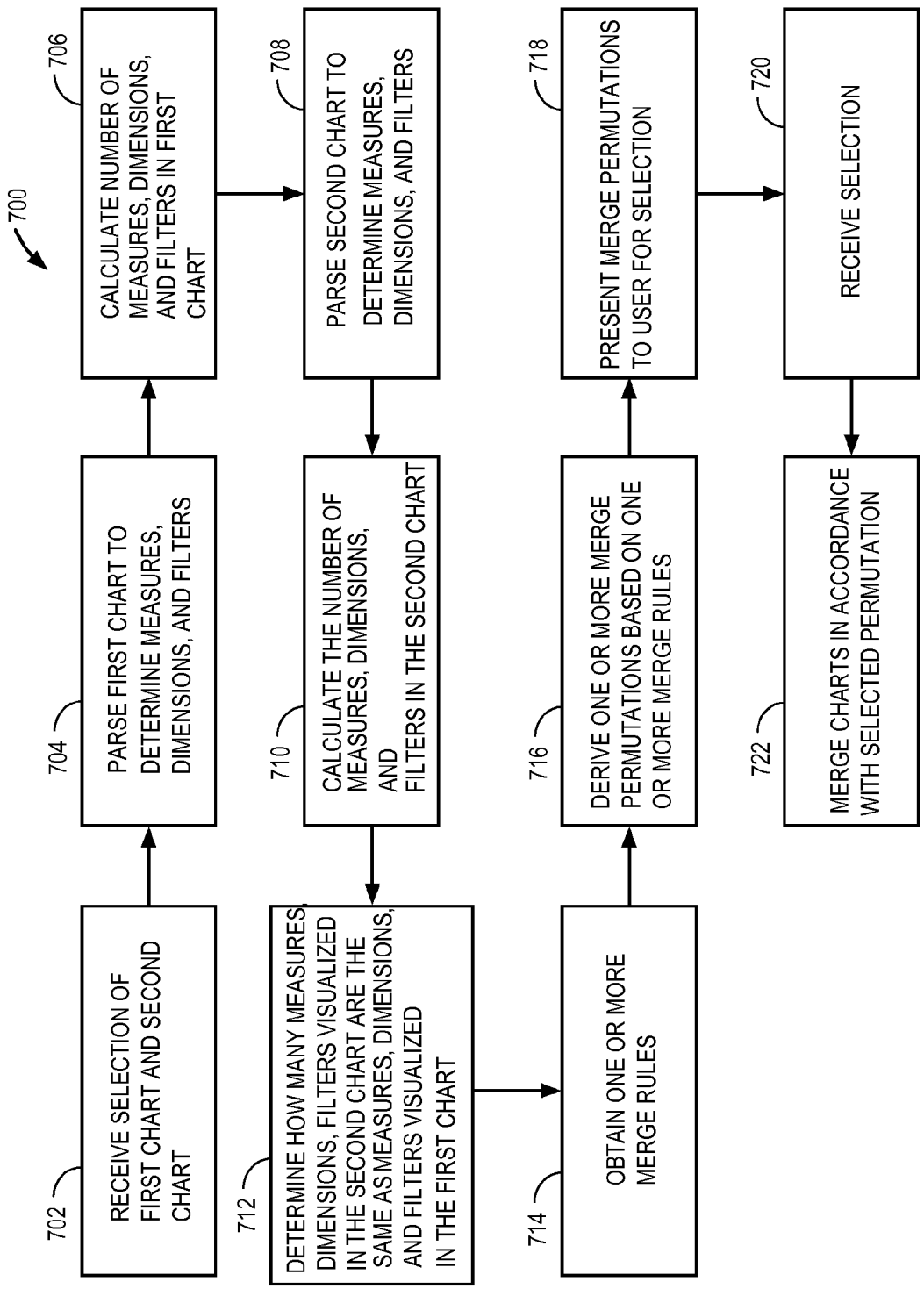
FIG. 7 is a flow diagram illustrating a method, in accordance with an example embodiment, of merging charts.

FIG. 7 is a flow diagram illustrating a method 700, in accordance with an example embodiment, of merging charts. At operation 702, a selection of a first chart 402 and a second chart 404 is received. As described above, these charts may be received through a drag-and-drop operation where the user drags and drops the first chart 402 onto the second chart. At operation 704, the first chart 402 is parsed to determine measures, dimensions, and filters (if any). At operation 706, the number of measures, dimensions, and filters in the first chart 402 is calculated. It should be noted that this involves determining the number of measures, the number of dimensions, and the number of filters separately, thus providing three different calculations for the first chart. At operation 708, the second chart 404 is parsed to determine measures, dimensions, and filters (if any). At operation 710, the number of measures, dimensions, and filters in the second chart 404 is calculated. It should be noted that this involves determining the number of measures, the number of dimensions, and the number of filters separately, thus providing three different calculations for the first chart.

At operation 712, it may be determined how many measures, dimensions, and filters visualized in the second chart 404 are the same as measures, dimensions, and filters visualized in the first chart. Thus, measures that are the same in both charts are determined, dimensions that are the same in both charts are determined, and filters that are the same in both charts are determined. At operation 714, one or more merge rules are obtained. This may include obtaining rules corresponding to the number of measures, dimensions, and filters visualized in the first chart 402 and to the number of measures, dimensions, and filters visualized in the second chart 404 (minus the measures, dimensions, and filters that are the same in both charts).

At operation 716, one or more merge permutations are derived based on the one or more merge rules. At operation 718, the merge permutations are presented to the user for selection. At operation 720, a merge selection from the user is received. At operation 722, the first and second charts are merged in accordance with the merge permutations.

Table 1 depicts various example chart merging rules in accordance with an example embodiment. In the chart, "M" stands for a measure and "D" stands for a dimension of an input chart. The numbers following the "M" or "D" respectively correspond to the number of the chart and to the number of the measure or dimension in that chart. Thus, M11 refers to the first measure of chart 1 while M21 refers to the first measure of chart 2. D12 refers to the second dimension of the first chart. Thus, the merging rules in Table 1 describe different chart merge permutations based on measures and dimensions in two input charts. It should be noted that, for simplicity, this table describes chart merge permutations of input charts having up to two measures and two dimensions. One of ordinary skill in the art will recognize, however, that the table could be expanded to cover any number of dimensions and any number of measures.

As an example, assume that M11 is a measure of revenue and D11 is a dimension for country, with M21 being a measure of cost and D21 being a dimension of product. Referring to Table 1 below, if a user selects as input charts a Chart 1 having 1 measure being M11 and 1 dimension being D11, and also a Chart 2 having the same single measure and single dimension then, since the charts are identical, no merging needs to occur (labeled as ID1 in Table 1). If, on the other hand, Chart 2 has measure being M21 and dimension being D11, then the merged chart may have the combination of the two measures M11 and M21, and the single dimension D11. In the example herein, this merged chart would indicate revenue and cost by country. The precise mechanism for displaying the combined measures of revenue and cost could vary depending on the chart type. For example, if the chart is a bar chart, for each country, one bar in a first color could indicate revenue and one bar in a different color could indicate cost.

In the case where dimensions are merged rather than measures, such as in ID3 where Chart 1 has measure M11 and dimension D11 while Chart 2 has measure M11 and dimension D21, then the merging of the dimensions could be handled differently than the merging of measures, depending upon whether the dimensions belong to the same hierarchy. For example, if D21 was city, then a split-by operation could be performed where the parent dimension D11 (country)" is split by the child dimension D21 (city).

ID1, ID2, and ID3 each describe case where there is a single merge chart permutation. ID4, on the other hand, with different dimensions and measures in Chart 1 and Chart 1, contains four possible merge chart permutations, labeled MC1, MC2, MC3, and MC4. Each of these could be ranked based on relevance and presented to the user for selection.

TABLE 1

| Id | Chart 1 | Chart 2 | Merged Chart (MC) |
|---|---|---|---|
| 1 | 1 measure: M11<br>1 dimension: D11 | 1 measure: M11<br>1 dimension: D11 | Charts are identical; no merging needed |
| 2 |  | 1 measure: M21<br>1 dimension: D11 | 2 measures: M11 + M21<br>1 dimension: D11 |
| 3 |  | 1 measure: M11<br>1 dimension: D21 | 1 measure: M11<br>2 dimensions: D11 + D21<br>Note: if D11 and D21 belong to the same hierarchy (e.g. Country, City), then the dimensions can be arranged according to the hierarchy. That is, The chart displays the parent dimension (e.g. Country) split-by the child dimension (e.g. City). |

TABLE 1-continued

| Id | Chart 1 | Chart 2 | Merged Chart (MC) |
|---|---|---|---|
| 4 | | 1 measure: M21<br>1 dimension: D21 | MC1<br>2 measures: M11 + M21<br>2 dimensions: D11 + D21<br>MC2<br>2 measures: M11 + M21<br>1 dimension: D11 or D21<br>MC3<br>1 measure: M11 or M21<br>2 dimensions: D11 + D21<br>MC4<br>1 measure: M11 or M21<br>1 dimension: D11 or D21<br>Note: if D11 and D21 belong to the same hierarchy (e.g. Country, City), then the dimensions can be arranged according to the hierarchy. |
| 5 | 2 measures: M11 + M12<br>1 dimension: D11 | 1 measure: M11 or M12<br>1 dimension: D11 | Merging would produce chart-spec 1 or 2; no merging needed |
| 6 | | 1 measure: M21<br>1 dimension: D11 | MC1<br>3 measures: M11 + M12 + M21<br>1 dimension: D11<br>MC2<br>2 measures: M11 + M21 or M12 + M21<br>1 dimension: D11 |
| 7 | | 1 measure: M11 or M12<br>1 dimension: D21 | MC1<br>2 measures: M11 + M12<br>2 dimensions: D11 + D21<br>MC2<br>1 measure: M11 or M12<br>2 dimensions: D11 + D21<br>MC3<br>1 measure: M11 or M12<br>1 dimension: D11 or D21<br>Note: if D11 and D21 belong to the same hierarchy (e.g. Country, City), then the dimensions can be arranged according to the hierarchy. |
| 8 | | 1 measure: M21<br>1 dimension: D21 | MC1<br>3 measures: M11 + M12 + M21<br>2 dimensions: D11 + D21<br>MC2<br>2 measures: M11 + M21 or M12 + M21<br>2 dimensions: D11 + D21<br>MC3<br>1 measure: M11 or M12 or M21<br>2 dimensions: D11 + D21<br>MC4<br>3 measures: M11 + M12 + M21<br>1 dimension: D11 or D21<br>MC5<br>2 measures: M11 + M21 or M12 + M21<br>1 dimension: D11 or D21<br>MC6<br>1 measure: M11 or M12 or M21<br>1 dimension: D11 or D21<br>Note: if D11 and D21 belong to the same hierarchy (e.g. Country, City), then the dimensions can be arranged according to the hierarchy. |
| 9 | | 2 measures: M11 or M12 + M21<br>1 dimension: D11 | See use case # 6 |
| 10 | | 2 measures: M11 or M12 + M21<br>1 dimension: D21 | See use case # 8 |

TABLE 1-continued

| Id | Chart 1 | Chart 2 | Merged Chart (MC) |
|---|---|---|---|
| 11 | | 2 measures: M21 + M22<br>1 dimension: D11 | MC1<br>4 measures: M11 + M12 + M21 + M22<br>1 dimension: D11<br>MC2<br>3 measures: M11 + M12 + M21 or M11 + M12 + M22 or M11 + M21 + M22 or M12 + M21 + M22<br>1 dimension: D11<br>MC3<br>2 measures: M11 + M21 or M11 + M22 or M12 + M21 or M12 + M22<br>1 dimension: D11 |
| 12 | 2 measures: M11 + M12<br>2 dimensions: D11 + D12 | 1 measure: M11 or M12<br>1 dimension: D11 or D12 | Merging would produce chart-spec 1 or 2; no merging needed |
| 13 | | 1 measure: M21<br>1 dimension: D11 or D12 | MC1<br>3 measures: M11 + M12 + M21<br>2 dimensions: D11 + D12<br>MC2<br>2 measures: M11 + M21 or M12 + M21<br>2 dimensions: D11 + D12 |
| 14 | | 1 measure: M11 or M12<br>1 dimension: D21 | MC1<br>2 measures: M11 + M12<br>3 dimensions: D11 + D12 + D21<br>MC2<br>2 measures: M11 + M12<br>2 dimensions D11 + D21 or D12 + D21<br>MC3<br>1 measure: M11 or M12 (the not contained in chart # 2)<br>1 dimension: D21<br>Note: if D11 or D12 and D21 belong to the same hierarchy (e.g. Country, City 610), then the dimensions can be arranged according to the hierarchy. |
| 15 | | 1 measure: M21<br>1 dimension: D21 | MC1<br>3 measures: M11 + M12 + M21<br>3 dimensions: D11 + D12 + D21<br>MC2<br>2 measures: M11 + M21 or M12 + M21<br>3 dimensions: D11 + D12 + D21<br>MC3<br>1 measure: M11 or M12 or M21<br>3 dimensions: D11 + D12 + D21<br>MC4<br>3 measures: M11 + M12 + M21<br>2 dimensions: D11 + D21 or D12 + D21<br>MC5<br>2 measures: M11 + M21 or M12 + M21<br>2 dimensions: D11 + D21 or D12 + D21<br>MC6<br>1 measure: M11 or M12 or M21<br>2 dimensions: D11 + D21 or D12 + D21<br>MC7<br>3 measures: M11 + M12 + M21<br>1 dimension: D11 or D12 or D21 |

TABLE 1-continued

| Id | Chart 1 | Chart 2 | Merged Chart (MC) |
|---|---|---|---|
| | | | MC8<br>2 measures: M11 + M21 or M12 + M21<br>1 dimension: D11 or D12 or D21<br>MC9<br>1 measure: M11 or M12 or M21<br>1 dimension: D11 or D12 or D21<br>Note: if D11 or D12 and D21 belong to the same hierarchy (e.g. Country, City), then the dimensions can be arranged according to the hierarchy. |
| 16 | | 2 measures: M11 or M12 + M21<br>1 dimension: D11 or D12 | See use case # 13 |
| 17 | | 2 measures: M11 or M12 + M21<br>1 dimension: D21 | See use case # 15 |
| 18 | | 2 measures: M21 + M22<br>1 dimension: D11 or D12 | MC1<br>4 measures: M11 + M12 + M21 + M22<br>2 dimensions: D11 + D12<br>MC2<br>3 measures: M11 + M12 + M21 or M11 + M12 + M22 or M11 + M21 + M22 or M12 + M21 + M22<br>2 dimensions: D11 + D12<br>MC3<br>2 measures: M11 + M21 or M11 + M22 or M12 + M21 or M12 + M22<br>2 dimensions: D11 + D12<br>MC4<br>4 measures: M11 + M12 + M21 + M22<br>1 dimension: D11 or D12<br>MC5<br>3 measures: M11 + M12 + M21 or M11 + M12 + M22 or M11 + M21 + M22 or M12 + M21 + M22<br>1 dimension: D11 or D12<br>MC6<br>2 measures: M11 + M21 or M11 + M22 or M12 + M21 or M12 + M22<br>1 dimension: D11 or D12 |
| 19 | | 2 measures: M21 + M22<br>1 dimension: D21 | MC1<br>4 measures: M11 + M12 + M21 + M22<br>3 dimensions: D11 + D12 + D21<br>MC2<br>3 measures: M11 + M12 + M21 or M11 + M12 + M22 or M11 + M21 + M22 or M12 + M21 + M22<br>3 dimensions: D11 + D12 + D21<br>MC3<br>2 measures: M11 + M21 or M11 + M22 or M12 + M21 or M12 + M22<br>3 dimensions: D11 + D12 + D21<br>MC4<br>1 measure: M11 or M12 or M21 or M22<br>3 dimensions: D11 + D12 + D21 |

TABLE 1-continued

| Id | Chart 1 | Chart 2 | Merged Chart (MC) |
|---|---|---|---|
| | | | MC5<br>4 measures: M11 + M12 + M21 + M22<br>2 dimensions: D11 + D21 or D12 + D21<br>MC6<br>3 measures: M11 + M12 + M21 or M11 + M12 + M22 or M11 + M21 + M22 or M12 + M21 + M22<br>2 dimensions: D11 + D21 or D12 + D21<br>MC7<br>2 measures: M11 + M21 or M11 + M22 or M12 + M21 or M12 + M22<br>2 dimensions: D11 + D21 or D12 + D21<br>MC8<br>1 measure: M11 or M12 or M21 or M22<br>2 dimensions: D11 + D21 or D12 + D21<br>MC9<br>4 measures: M11 + M12 + M21 + M22<br>1 dimension: D11 or D12 or D21<br>MC10<br>3 measures: M11 + M12 + M21 or M11 + M12 + M22 or M11 + M21 + M22 or M12 + M21 + M22<br>1 dimension: D11 or D12 or D21<br>MC11<br>2 measures: M11 + M21 or M11 + M22 or M12 + M21 or M12 + M22<br>1 dimension: D11 or D12 or D21 |
| 20 | | 1 measure: M11 or M12<br>2 dimensions: D11 or D12 + D21 | See use case # 14 |
| 21 | | 1 measure: M21<br>2 dimensions: D11 or D12 + D21 | See use case # 15 |
| 22 | | 1 measure: M11 or M12<br>2 dimensions: D21 + D22 | MC1<br>2 measures: M11 + M12<br>4 dimensions: D11 + D12 + D21 + D22<br>MC2<br>1 measures: M11 or M12<br>4 dimensions: D11 + D12 + D21 + D22<br>MC3<br>2 measures: M11 + M12<br>3 dimensions: D11 + D12 + D21 or D11 + D12 + D22 or D11 + D21 + D22 or D12 + D21 + D22<br>MC4<br>1 measures: M11 or M12<br>3 dimensions: D11 + D12 + D21 or D11 + D12 + D22 or D11 + D21 + D22 or D12 + D21 + D22<br>MC5<br>2 measures: M11 + M12<br>2 dimensions: D11 + D21 or D11 + D22 or D12 + D21 or D12 + D22<br>MC6<br>1 measures: M11 or M12<br>2 dimensions: D11 + D21 or D11 + D22 or D12 + D21 or D12 + D22 |

TABLE 1-continued

| Id | Chart 1 | Chart 2 | Merged Chart (MC) |
|---|---|---|---|
| 23 | | 1 measure: M21<br>2 dimensions: D21 + D22 | MC1<br>3 measures: M11 + M12 + M21<br>4 dimensions: D11 + D12 + D21 + D22<br>MC2<br>2 measures: M11 + M21 or M12 + M21<br>4 dimensions: D11 + D12 + D21 + D22<br>MC3<br>1 measures: M11 or M12 or M21<br>4 dimensions: D11 + D12 + D21 + D22<br>MC4<br>3 measures: M11 + M12 + M21<br>3 dimensions: D11 + D12 + D21 or D11 + D12 + D22 or D11 + D21 + D22 or D12 + D21 + D22<br>MC5<br>2 measures: M11 + M21 or M12 + M21<br>3 dimensions: D11 + D12 + D21 or D11 + D12 + D22 or D11 + D21 + D22 or D12 + D21 + D22<br>MC6<br>1 measure: M11 or M12 or M21<br>3 dimensions: D11 + D12 + D21 or D11 + D12 + D22 or D11 + D21 + D22 or D12 + D21 + D22<br>MC7<br>3 measures: M11 + M12 + M21<br>2 dimensions: D11 + D21 or D11 + D22 or D12 + D21 or D12 + D22<br>MC8<br>2 measures: M11 + M21 or M12 + M21<br>2 dimensions: D11 + D21 or D11 + D22 or D12 + D21 or D12 + D22<br>MC9<br>1 measure: M11 or M12 or M21<br>2 dimensions: D11 + D21 or D11 + D22 or D12 + D21 or D12 + D22<br>MC10<br>3 measures: M11 + M12 + M21<br>1 dimension: D11 or D12 or D21 or D22<br>MC11<br>2 measures: M11 + M21 or M12 + M21<br>1 dimension: D11 or D12 or D21 or D22 |
| 24 | | 2 measures: M11 + M12<br>2 dimensions: D11 + D12 | Charts are identical; no merging |
| 25 | | 2 measures: M11 or M12 + M21<br>2 dimensions: D11 + D12 | See use case # 13 |
| 26 | | 2 measures: M21 + M22<br>2 dimensions: D11 + D12 | MC1<br>4 measures: M11 + M12 + M21 + M22<br>2 dimensions: D11 + D12<br>MC2<br>3 measures: M11 + M12 + M21 or M11 + M12 + M22 or M11 + M21 + M22 or M12 + M21 + M22<br>2 dimensions: D11 + D12 |

TABLE 1-continued

| Id | Chart 1 | Chart 2 | Merged Chart (MC) |
|---|---|---|---|
| | | | MC3<br>2 measures: M11 + M21 or M11 + M22 or M12 + M21 or M12 + M22<br>2 dimensions: D11 + D12 |
| 27 | | 2 measures: M11 + M12<br>2 dimensions: D11 or D12 + D21 | See use case # 14 |
| 28 | | 2 measures: M11 or M12 + M21<br>2 dimensions: D11 or D12 + D21 | See use case # 15 |
| 29 | | 2 measures: M21 + M22<br>2 dimensions: D11 or D12 + D21 | See use case # 19 |
| 30 | | 2 measures: M11 + M12<br>2 dimensions: D21 + D22 | See use case # 22 |
| 31 | | 2 measures: M11 or M12 + M21<br>2 dimensions: D21 + D22 | See use case # 23 |
| 32 | | 2 measures: M21 + M22<br>2 dimensions: D21 + D22 | MC1<br>4 measures: M11 + M12 + M21 + M22<br>4 dimensions: D11 + D12 + D21 + D22<br>MC2<br>3 measures: M11 + M12 + M21 or M11 + M12 + M22 or M11 + M21 + M22 or M12 + M21 + M22<br>4 dimensions: D11 + D12 + D21 + D22<br>MC3<br>2 measures: M11 + M21 or M11 + M22 or M12 + M21 or M12 + M22<br>4 dimensions: D11 + D12 + D21 + D22<br>MC4<br>1 measure: M11 or M12 or M21 or M22<br>4 dimensions: D11 + D12 + D21 + D22<br>MC5<br>4 measures: M11 + M12 + M21 + M22<br>3 dimensions: D11 + D12 + D21 or D11 + D12 + D22 or D11 + D21 + D22 or D12 + D21 + D22<br>MC6<br>3 measures: M11 + M12 + M21 or M11 + M12 + M22 or M11 + M21 + M22 or M12 + M21 + M22<br>3 dimensions: D11 + D12 + D21 or D11 + D12 + D22 or D11 + D21 + D22 or D12 + D21 + D22<br>MC7<br>2 measures: M11 + M21 or M11 + M22 or M12 + M21 or M12 + M22<br>3 dimensions: D11 + D12 + D21 or D11 + D12 + D22 or D11 + D21 + D22 or D12 + D21 + D22 |

TABLE 1-continued

| Id | Chart 1 | Chart 2 | Merged Chart (MC) |
|---|---|---|---|
| | | | MC8<br>1 measure: M11 or M12 or M21 or M22<br>3 dimensions: D11 + D12 + D21 or D11 + D12 + D22 or D11 + D21 + D22 or D12 + D21 + D22 |
| | | | MC9<br>4 measures: M11 + M12 + M21 + M22<br>2 dimensions: D11 + D21 or D11 + D22 or D12 + D21 or D12 + D22 |
| | | | MC10<br>3 measures: M11 + M12 + M21 or M11 + M12 + M22 or M11 + M21 + M22 or M12 + M21 + M22<br>2 dimensions: D11 + D21 or D11 + D22 or D12 + D21 or D12 + D22 |
| | | | MC11<br>2 measures: M11 + M21 or M11 + M22 or M12 + M21 or M12 + M22<br>2 dimensions: D11 + D21 or D11 + D22 or D12 + D21 or D12 + D22 |
| | | | MC12<br>1 measure: M11 or M12 or M21 or M22<br>2 dimensions: D11 + D21 or D11 + D22 or D12 + D21 or D12 + D22 |
| | | | MC13<br>4 measures: M11 + M12 + M21 + M22<br>1 dimension: D11 or D12 or D21 or D22 |
| | | | MC14<br>3 measures: M11 + M12 + M21 or M11 + M12 + M22 or M11 + M21 + M22 or M12 + M21 + M22<br>1 dimension: D11 or D12 or D21 or D22 |
| | | | MC15<br>2 measures: M11 + M21 or M11 + M22 or M12 + M21 or M12 + M22<br>1 dimension: D11 or D12 or D21 or D22 |

Example Mobile Device

Figure 8:
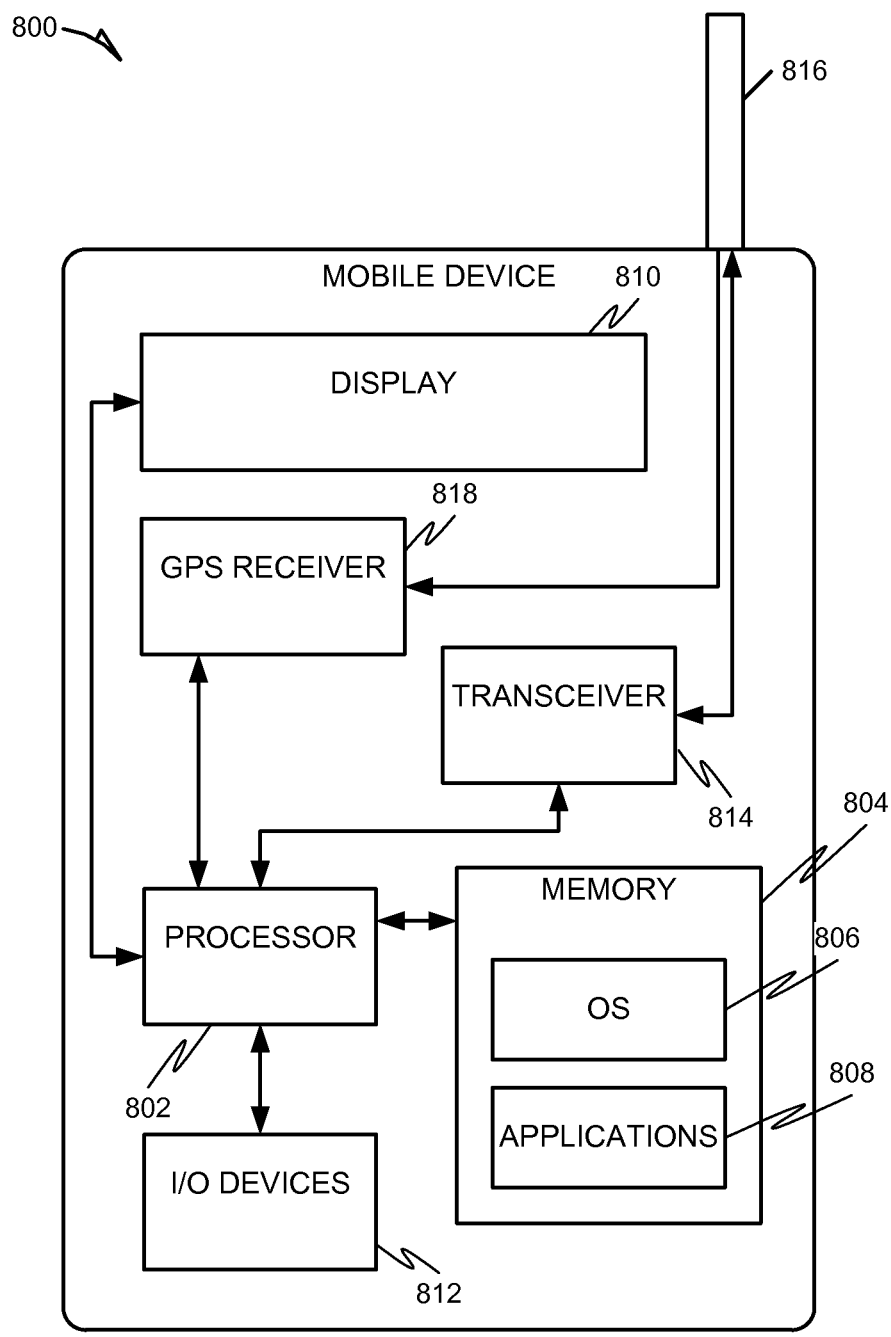
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 can be adapted to store an operating system (OS) 806, as well as application programs 808. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 802 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 802 or other programmable processor 802) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost 606 and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 802 configured using software, the general-purpose processor 802 can be configured as different hardware-implemented modules at different times. Software can accordingly configure a processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 802 that are temporarily configured (e.g., by software) or permanently configured to perform the relevant operations. Whether temporarily or permanently configured, such processors 802 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 802 or processor-implemented modules. The performance of certain of the operations can be distributed among the one or more processors 802, not only residing within a single machine, but deployed across a number of machines. In some example embodiments, the processor 802 or processors 802 can be located in a single location (e.g., within a home environment, an office environment or a server farm), while in other embodiments the processors 802 can be distributed across a number of locations.

The one or more processors 802 can also operate to support performance of the relevant operations in a "cloud computing" environment or as a "software as a service" (SaaS). For example, at least some of the operations can be performed by a group of computers (as examples of machines including processors 802), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a stand alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 802 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 802), or in a combination of permanently and temporarily configured hardware can be a design choice. Below are set out hardware (e.g., machine) and software architectures that can be deployed, in various example embodiments.

Example Machine Architecture and Machine-Readable Medium

Figure 9:
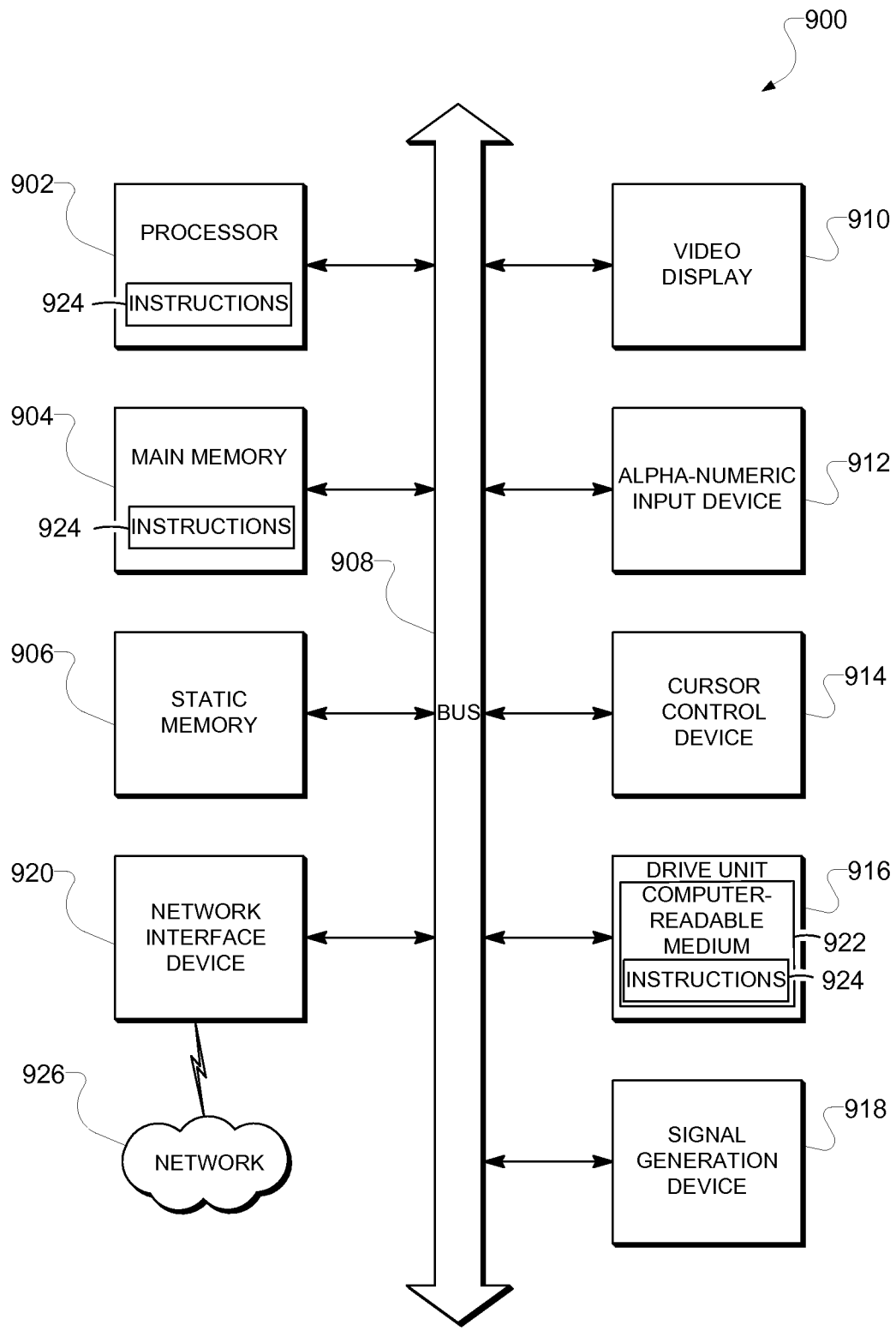
FIG. 9 is a block diagram of machine in the example form of a computer system 900 within which instructions can be executed for causing the machine to perform any one or more of the methodologies discussed herein.

FIG. 9 is a block diagram of machine in the example form of a computer system 900 within which instructions 924 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a CPU, a graphics processing unit (GPU), or both), a main memory 904 and a static memory 906, which communicate with each other via a bus 908. The computer system 900 can further include a video display 910 (e.g., a liquid crystal display (LCD) or a cathode ray tube (CRT)). The computer system 900 also includes an alphanumeric input device 912 (e.g., a keyboard or a touch-sensitive display screen), a cursor control device 914 (e.g., a mouse), a drive unit 916, a signal generation device 918 (e.g., a speaker), and a network interface device 920.

Machine-Readable Medium

The drive unit 916 includes a machine-readable medium 922 on which is stored one or more sets of instructions (e.g., software) 924 embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media 922.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions 924 for execution by the machine and that cause the machine to perform any one or more of the methodologies of the present disclosure or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can further be transmitted or received over a communications network 926 using a transmission medium. The instructions 924 can be transmitted using the network interface device 920 and any one of a number of well-known transfer protocols (e.g., HTTP). Examples of communication networks 926 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 924 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a selection of a first chart and a second chart;
parsing the first chart to determine any measures, dimensions, or filters visualized in the first chart;
calculating a number of measures, a number of dimensions, and a number of filters visualized in the first chart;
parsing the second chart to determine any measures, dimensions, or filters visualized in the second chart;
calculating a number of measures, a number of dimensions, and a number of filters visualized in the second chart;

determining how many of the measures, dimensions or filters visualized in the second chart are the same as measures, dimensions or filters visualized in the first chart;

obtaining one or more merge rules corresponding to the number of measures, the number of dimensions, and the number filters visualized in the first chart and to the number of measures, the number of dimensions, and the number filters visualized in the second chart that aren't the same as measures, dimensions or filters visualized in the first chart;

deriving one or more merge permutations based on the obtained one or more merge rules; and merging the first chart and the second chart in accordance with one of the one or more merge permutations.

2. The method of claim 1, further comprising:

presenting the one or more merge permutations to a user for selection;

receiving a selection of one of the one or more merge permutations from the user; and the merging comprises merging the first chart and the second chart in accordance with the selected permutation.

3. The method of claim 2, further comprising:

ranking the one or more merge permutations based on relevance to the user; and wherein the presenting includes presenting the one or more merge permutations based upon the ranking to the user for selection.

4. The method of claim 3, wherein the ranking uses a machine learning algorithm to determine relevance to the user.

5. The method of claim 4, wherein the machine learning algorithm uses past user activity as an input.

6. The method of claim 1, wherein the receiving a selection includes receiving a drag-and-drop navigation command where the first chart is dragged and dropped onto the second chart in a graphical user interface.

7. The method of claim 1, further comprising:

determining if any of the dimensions visualized in the first chart are hierarchical dimensions by virtue of being part of a hierarchy with any hierarchical dimensions visualized in the second chart; and in response to a determination that at least one dimension visualized in the first chart is part of a hierarchy with at least one of the dimensions visualized in the second chart, executing one of the obtained one or more merge rules to merge the one or more hierarchical dimensions visualized in the first chart with the one or more hierarchical dimensions visualized in the second chart using a split-by operation.

8. A system comprising:

a chart engine comprising one or more processors and configured to obtain data from one or more databases and create one or more charts based on the data;

a user interface component comprising one or more processors and configured to receive input from a user as to a selection of a first chart and a second chart to merge; and a merge engine comprising:
  a chart merging rules database including one or more merge rules;
  an input chart parser comprising one or more processors and configured to parse the first chart to determine one or more measures, dimensions, and filters visualized in the first chart and parse the second chart to determine one or more measures, dimensions, and filters visualized in the second chart;
  a chart merging engine comprising one or more processors and configured to:
    calculate a number of measures, a number of dimensions, and a number of filters visualized in the first chart;
    calculate a number of measures, a number of dimensions, and a number of filters visualized in the second chart;
    determine how many of the measures, dimensions or filters visualized in the second chart are the same as measures, dimensions or filters visualized in the first chart;
    obtain one or more merge rules corresponding to the number of measures, the number of dimensions, and the number filters visualized in the first chart and to the number of measures, the number of dimensions, and the number filters visualized in the second chart that aren't the same as measures, dimensions or filters visualized in the first chart;
    derive one or more merge permutations based on the obtained one or more merge rules; and
    merge the first chart and the second chart in accordance with one of the one or more merge permutations.

9. The system of claim 8, wherein the chart merging engine further comprises a chart permutation ranking component comprising one or more processors and configured to rank the one or more merge permutations based on relevance to the user.

10. The system of claim 9, wherein the user interface component is further configured to:

present the one or more merge permutations based upon the ranking to the user for selection; and receive a selection of one of the one or more merge permutations from the user; and wherein the merging comprises merging the first chart and the second chart in accordance with the selected permutation.

11. The system of claim 10, wherein the receiving a selection includes receiving a drag-and-drop navigation command where the first chart is dragged and dropped onto the second chart in a graphical user interface.

12. The system of claim 9, wherein the ranking uses a machine learning algorithm to determine relevance to the user.

13. The system of claim 8, further comprising a merged chart database and wherein the chart merging engine is further configured to save the merged chart in the merged chart database for later selection by the user to be merged with another chart.

14. A non-transitory computer-readable medium storing executable instructions thereon, which, when executed by a processor, causes the processor to perform operations comprising:

receiving a selection of a first chart and a second chart;

parsing the first chart to determine any measures, dimensions, or filters visualized in the first chart;

calculating a number of measures, a number of dimensions, and a number of filters visualized in the first chart;

parsing the second chart to determine any measures, dimensions, or filters visualized in the second chart;

calculating a number of measures, a number of dimensions, and a number of filters visualized in the second chart;

determining how many of the measures, dimensions or filters visualized in the second chart are the same as measures, dimensions or filters visualized in the first chart;

obtaining one or more merge rules corresponding to the number of measures, the number of dimensions, and the number filters visualized in the first chart and to the number of measures, the number of dimensions, and the number filters visualized in the second chart that aren't the same as measures, dimensions or filters visualized in the first chart;

deriving one or more merge permutations based on the obtained one or more merge rules; and merging the first chart and the second chart in accordance with one of the one or more merge permutations.

15. The non-transitory computer-readable medium of claim 14, wherein the operations further comprise:

presenting the one or more merge permutations to a user for selection;

receiving a selection of one of the one or more merge permutations from the user; and the merging comprises merging the first chart and the second chart in accordance with the selected permutation.

16. The non-transitory computer-readable medium of claim 15, wherein the operations further comprise:

ranking the one or more merge permutations based on relevance to the user; and wherein the presenting includes presenting the one or more merge permutations based upon the ranking to the user for selection.

17. The non-transitory computer-readable medium of claim 16, wherein the ranking uses a machine learning algorithm to determine relevance to the user.

18. The non-transitory computer-readable medium of claim 17, wherein the machine learning algorithm uses past user activity as an input.

19. The non-transitory computer-readable medium of claim 14, wherein the receiving a selection includes receiving a drag-and-drop navigation command where the first chart is dragged and dropped onto the second chart in a graphical user interface.

20. The non-transitory computer-readable medium of claim 14, wherein the operations further comprise:

determining if any of the dimensions visualized in the first chart are hierarchical dimensions by virtue of being part of a hierarchy with any hierarchical dimensions visualized in the second chart; and in response to a determination that at least one dimension visualized in the first chart is part of a hierarchy with at least one of the dimensions visualized in the second chart, executing one of the obtained one or more merge rules to merge the one or more hierarchical dimensions visualized in the first chart with the one or more hierarchical dimensions visualized in the second chart using a split-by operation.

\* \* \* \* \*